(12) United States Patent
Cheshire

(10) Patent No.: US 9,619,517 B2
(45) Date of Patent: *Apr. 11, 2017

(54) METHOD AND APPARATUS FOR ACCELERATING THE EXPIRATION OF RESOURCE RECORDS IN A LOCAL CACHE

(71) Applicant: Apple Inc., Cupertino, CA (US)

(72) Inventor: Stuart D. Cheshire, San Jose, CA (US)

(73) Assignee: Apple Inc., Cupertino, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 14/279,104

(22) Filed: May 15, 2014

(65) Prior Publication Data

US 2014/0258319 A1    Sep. 11, 2014

Related U.S. Application Data

(62) Division of application No. 10/676,572, filed on Sep. 30, 2003.

(Continued)

(51) Int. Cl.
*G06F 17/30* (2006.01)
*H04L 29/08* (2006.01)

(52) U.S. Cl.
CPC ...... *G06F 17/3048* (2013.01); *H04L 67/2852* (2013.01); *H04L 69/329* (2013.01)

(58) Field of Classification Search
CPC ... H04L 69/329; H04L 67/2852; H04L 67/16; H04L 29/08; H04L 29/12066;

(Continued)

(56) References Cited

U.S. PATENT DOCUMENTS

| 4,661,902 A | 4/1987 | Hochsprung et al. |
| 4,689,786 A | 8/1987 | Sidhu et al. |

(Continued)

OTHER PUBLICATIONS

Stuart Cheshire, Marc Krochmal: "DNS-Based Service Discovery" Internet Draft, Jun. 20, 2003, pp. 1-30, Retrieved from the Internet: URL: https://web.archive.org/web/20030812150339/http://files.dns-sd.org/draft-cheshire-dnsext-dns-sd.txt> retrieved on Jul. 7, 2014.*

(Continued)

*Primary Examiner* — Douglas Blair
*Assistant Examiner* — Schquita Goodwin
(74) *Attorney, Agent, or Firm* — Sterne, Kessler, Goldstein & Fox P.L.L.C.

(57) ABSTRACT

One embodiment of the present invention provides a system that facilitates reconfirmation of resource records in a cache. The system starts by retrieving the resource record at a client and attempting to establish communication using the data in that resource record. In the event that communication is not successful, the system responds by issuing one or more queries for the resource record in question. The system then waits for a response to the query. If the response to the query is not received in a pre-determined amount of time, the system invalidates the resource record. The response from the device is a multicast response, thereby allowing other clients to update corresponding resource records in their local caches without querying the device, and thus saving network bandwidth.

20 Claims, 3 Drawing Sheets

Related U.S. Application Data

(60) Provisional application No. 60/496,843, filed on Aug. 20, 2003.

(58) Field of Classification Search
CPC ... H04L 61/1511; H04L 45/02; H04L 63/101; H04L 63/108; G06F 17/30864; G06F 12/0669; G06F 17/30; G06F 17/3048
USPC ..... 713/163; 707/758, 3; 709/200, 246, 220, 709/223, 202, 203, 204, 226, 228; 370/386, 389, 90, 256, 395.21, 395.33, 370/352, 229; 711/133
See application file for complete search history.

(56) References Cited

U.S. PATENT DOCUMENTS

| | | | |
|---|---|---|---|
| 5,150,464 A | 9/1992 | Sidhu et al. | |
| 5,222,242 A | 6/1993 | Choi et al. | |
| 5,282,270 A | 1/1994 | Oppenheimer et al. | |
| 5,388,213 A | 2/1995 | Oppenheimer et al. | |
| 5,450,408 A * | 9/1995 | Phaal | 370/256 |
| 5,745,699 A | 4/1998 | Lynn et al. | |
| 5,825,752 A * | 10/1998 | Fujimori | H04L 12/40058 348/14.08 |
| 5,881,379 A * | 3/1999 | Beier et al. | |
| 5,884,322 A | 3/1999 | Sidhu et al. | |
| 6,021,429 A * | 2/2000 | Danknick | H04L 29/12009 709/208 |
| 6,144,666 A * | 11/2000 | Chen et al. | 370/395.3 |
| 6,161,008 A * | 12/2000 | Lee | H04M 3/42229 370/352 |
| 6,321,263 B1 | 11/2001 | Luzzi et al. | |
| 6,370,142 B1 * | 4/2002 | Pitcher et al. | 370/390 |
| 6,427,170 B1 * | 7/2002 | Sitaraman | H04L 29/12066 709/226 |
| 6,496,859 B2 | 12/2002 | Roy et al. | |
| 6,505,253 B1 * | 1/2003 | Chiu | H04L 12/1868 370/229 |
| 6,560,635 B1 * | 5/2003 | Lea | H04L 12/2805 709/203 |
| 6,574,197 B1 | 6/2003 | Kanamaru et al. | |
| 6,643,357 B2 | 11/2003 | Lumsden | |
| 6,834,302 B1 | 12/2004 | Harvell | |
| 7,006,836 B2 | 2/2006 | Yokoyama | |
| 7,072,982 B2 | 7/2006 | Teodosiu et al. | |
| 7,085,763 B2 | 8/2006 | Ochiai et al. | |
| 7,117,201 B2 | 10/2006 | Kuno et al. | |
| 7,117,264 B2 | 10/2006 | Becker et al. | |
| 7,143,108 B1 | 11/2006 | George | |
| 7,164,885 B2 | 1/2007 | Jonsson et al. | |
| 7,167,762 B2 | 1/2007 | Glanzer et al. | |
| 7,177,869 B2 | 2/2007 | Yoshimura et al. | |
| 7,194,552 B1 | 3/2007 | Schneider | |
| 7,209,736 B2 | 4/2007 | Link et al. | |
| 7,336,668 B2 | 2/2008 | Adams | |
| 1,474,431 A1 | 1/2009 | Yamano et al. | |
| 7,474,431 B2 | 1/2009 | Yamano et al. | |
| 7,529,820 B2 | 5/2009 | Eatough et al. | |
| 7,706,362 B1 * | 4/2010 | Senthilnathan et al. | 370/389 |
| 7,925,705 B2 | 4/2011 | Ishimoto et al. | |
| 2001/0052052 A1 * | 12/2001 | Peng | H04L 41/00 711/133 |
| 2002/0035621 A1 * | 3/2002 | Zintel et al. | 709/220 |
| 2002/0054596 A1 * | 5/2002 | Sengodan | H04L 12/64 370/395.21 |
| 2002/0107982 A1 | 8/2002 | Teodosiu et al. | |
| 2002/0143855 A1 * | 10/2002 | Traversat | G06F 9/4416 709/202 |
| 2002/0188678 A1 * | 12/2002 | Edecker | H04L 29/12066 709/204 |
| 2003/0026410 A1 | 2/2003 | Lumsden | |
| 2003/0050955 A1 | 3/2003 | Eatough et al. | |
| 2003/0055817 A1 | 3/2003 | Yoshimura et al. | |
| 2003/0055828 A1 * | 3/2003 | Koch | G06F 17/241 |
| 2003/0084039 A1 * | 5/2003 | Balogh | 707/3 |
| 2003/0169734 A1 * | 9/2003 | Lu et al. | 370/386 |
| 2004/0044793 A1 * | 3/2004 | Pauly et al. | 709/246 |
| 2004/0059722 A1 * | 3/2004 | Yeh et al. | 707/3 |
| 2004/0083262 A1 * | 4/2004 | Trantow | G06F 9/5072 709/203 |
| 2004/0167974 A1 * | 8/2004 | Bunn et al. | 709/223 |
| 2004/0267876 A1 * | 12/2004 | Kakivaya et al. | 709/200 |
| 2005/0007628 A1 | 1/2005 | Yamano et al. | |
| 2006/0221863 A1 | 10/2006 | Ishimoto et al. | |

OTHER PUBLICATIONS

Stuart Chesire, Marc Krochman: "Multicas DNS" Internet Draft, Jan. 29, 2003 (Jan. 29, 2003) pp. 1-43, XP002306128. Retrieved from the Internet: URL:http://www.cs-ipv6.1ancs.ac.uk/ipv6/documents/standards/general-comms/internet-drafts/draft-chesire-dnsext-multicastdns-03.txt> retrieved on Nov. 16, 2004 Item 6. abstract.

International Search Report directed to related International Application No. PCT/US2004/013646, mailed Nov. 29, 2004; 3 pages.

International Preliminary Report on Patentability with Written Opinion for International Application No. PCT/US2004/013646, dated Feb. 21, 2006; 6 pages.

* cited by examiner

METHOD AND APPARATUS FOR ACCELERATING THE EXPIRATION OF RESOURCE RECORDS IN A LOCAL CACHE

RELATED APPLICATION

The instant application is a divisional of, and hereby claims priority under 35 U.S.C. §120 to, pending U.S. patent application Ser. No. 10/676,572, entitled "Method and Apparatus for Accelerating the Expiration of Resource Records in a Local Cache," by inventor Stuart D. Cheshire, which was filed on 30 Sep. 2003. U.S. patent application Ser. No. 10/676,572 claims priority under 35 U.S.C. §119 to U.S. Provisional Patent Application No. 60/496,843, filed on 20 Aug. 2003, entitled "Method and Apparatus for Accelerating the Expiration of Resource Records in a Local Cache," by inventor Stuart D. Cheshire.

BACKGROUND

Field of the Invention

The present invention relates to computer networks. More specifically, the present invention relates to a method and an apparatus accelerating the expiration of local resource records in a local cache.

Related Art

The explosive growth of broadband technology and network infrastructure, coupled with continually decreasing prices, has led to an increasing number of computer networks in homes and small businesses. Along with this small-office/home-office network revolution comes the daunting task of configuring and administering these networks. Plug-and-play network protocols, such as Apple Computer Inc.'s Rendezvous, have been developed to simplify administration tasks. Within Rendezvous, devices, such as printers, scanners, and network attached storage, automatically configure themselves and advertise their services upon being connected to the network. Computer systems on the network add resource records for these devices to their local cache upon receiving the advertisement, thus maintaining a list of available services on the network.

Along with the benefits of maintaining a local cache come problems. Computer systems on the network must continually update their cache records to maintain an accurate list of available services. Traditionally, computer systems have done this by querying the services and waiting for a response. If a response is not received within a specified amount of time, or after a specified amount of tries, the record pertaining to the service or associated device is deleted from the cache. Frequently polling services (and related devices) in this way provides a more accurate list of services, but can dramatically increase network traffic.

One problem with caching resource records arises from stale data. A device may be removed from the network in a manner that does not allow it to report the unavailability of its services. Power failures, improper shutdowns, and disconnected network cables are just a few examples of common occurrences that can cause invalid cache records. Often, users unsuccessfully try to use a service because a corresponding locally cached record for the service is invalid, which causes the service incorrectly to show up locally as being available. This can result in frustration to the user because the service still shows up as available in the local list. Moreover, even if some cache records are invalidated on some computer systems, the same invalid cache records may still be present on other computer systems on the network.

Hence, what is needed is a method and an apparatus for maintaining resource records in a cache without the limitations listed above.

SUMMARY

One embodiment of the present invention provides a system that facilitates validating a resource record in a cache. The system starts by retrieving the resource record at a client and attempting to use this information to establish communication with the corresponding service. If the attempt to establish communication is unsuccessful, then this suggests that the data in the resource record may be incorrect, so a query for that resource record is issued on the network. If a response is received containing different resource record data, then the cache is updated with the new data, and the attempt to establish communication is repeated using the new information. If, after sending the query one, two, three, or more, times, as appropriate, no response is received, then this indicates that the resource record is no longer valid, and it is deleted from the cache. In this way stale data is deleted more promptly that it would be if the decision were made solely based on the time-to-live originally attached to that data.

When the record is deleted from the cache, this technique may then be applied recursively to call into question any records that refer to the now-deleted record. To take an example from the domain name system, if the now-deleted record were an address record, then any other records (e.g. SRV, PTR, CNAME, etc.) containing the name of this address record on their right-hand side are similarly suspect, and should be similarly updated or deleted as appropriate. In the case of Apple's Rendezvous, the response from the device is a multicast response, thereby allowing other clients to update corresponding resource records in their local caches without querying the device, and thus saving network bandwidth.

In a variation on this embodiment, prior to invalidating the resource record, the system issues a second query for the resource record and waits for a response to the second query from the device. If the response to the second query is not received in a pre-determined amount of time, the system invalidates the resource record.

In a variation on this embodiment, the system receives a message from a second client querying for a second resource record. Upon receiving the query, the system locates a second resource record and waits for a multicast response to the multicast message. If the multicast response to the multicast message is not received in the pre-determined amount of time, the system invalidates the second resource record.

In a variation on this embodiment, invalidating the resource record also involves invalidating a child record of the resource record.

In a variation on this embodiment, if the response to the query is not received in a pre-determined amount of time, the system retrieves a parent record of the resource record at the client and multicasts a query for the parent record. The system then waits for a response to the query from the device, and if the response to the query is not received in a pre-determined amount of time, the system invalidates the parent record.

In a variation on this embodiment, if the response to the query is not received in a pre-determined amount of time, the system retrieves a parent record of the resource record at the client and multicasts a query for the parent record. The system then receives a response to the query from the device, and updates the resource record with the information included in the response.

In a further variation, the system updates the parent record with the information received in the response.

In a variation on this embodiment, the system is invoked to validate resource records in the cache at a pre-specified time interval.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Network

Figure 1:
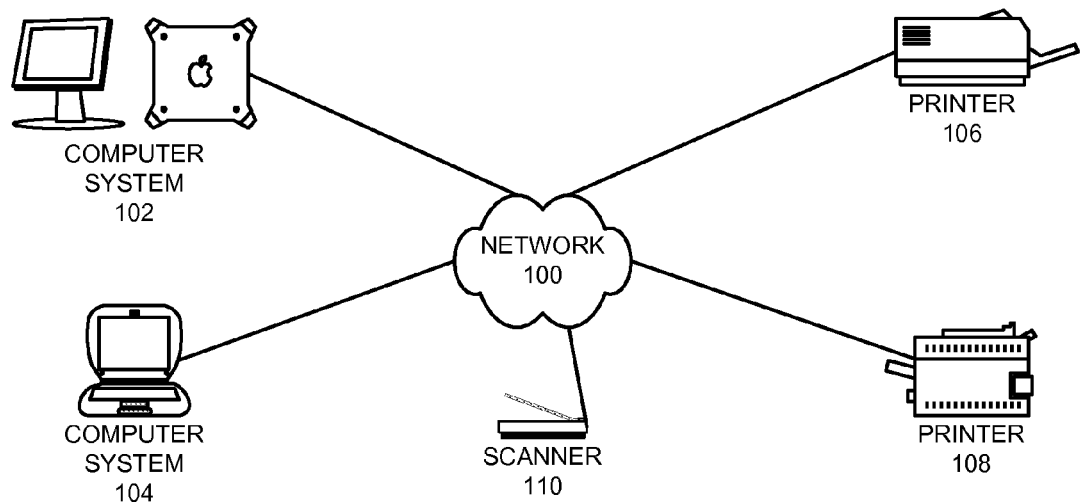
FIG. 1 illustrates a computer network in accordance with an embodiment of the present invention.

FIG. 1 illustrates a computer network 100 in accordance with an embodiment of the present invention. Network 100 can generally include any type of wired or wireless communication channel capable of coupling together computing nodes. This includes, but is not limited to, a local area network, a wide area network, or a combination of networks. In one embodiment of the present invention, network 100 includes the Internet.

Network 100 includes computer systems 102 and 104, printers 106 and 108, and scanner 110. Computer systems 102 and 104 can generally include any type of computer system, including, but not limited to, a computer system based on a microprocessor, a mainframe computer, a digital signal processor, a portable computing device, a personal organizer, a device controller, and a computational engine within an appliance.

In one embodiment of the present invention, the devices on network 100 adhere to a plug-and-play protocol, such as Apple Computer, Inc.'s Rendezvous technology. Printers 106 and 108, and scanner 110 self-configure to network 100 and advertise their services via multicast messages to all nodes on network 100. Computer systems 102 and 104 each utilize a local cache that contains resource records for the known devices and services on network 100.

Cached Resource Records

Figure 2:
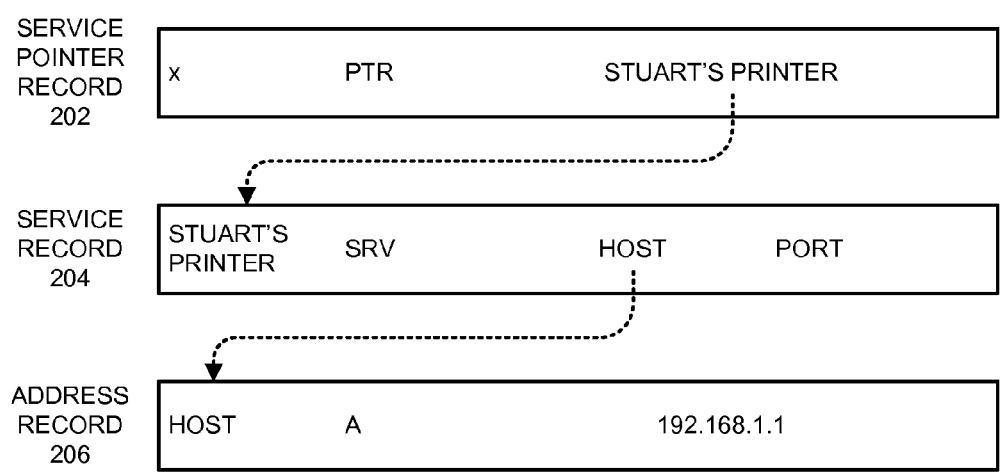
FIG. 2 illustrates cached resource records in accordance with an embodiment of the present invention.

FIG. 2 illustrates cached resource records in accordance with an embodiment of the present invention. Each device on network 100, such as printer 106, may have a several resource records containing information pertaining to that device, such as service pointer record 202, in the cache on computer systems in network 100. Service pointer record 202 includes the type of service and the name of the service instance. In the example shown in FIG. 2, service pointer record 202 identifies a printing service named "Stuart's Printer."

Each service pointer record 202 refers by name to a corresponding service record 204, which contains information about a service on the device named in service record 204. Note that one device may offer multiple services, and thus may have multiple service records. Service record 204 contains the name of the device that the service is provided by. In the example shown in FIG. 2, service record 204 contains the name of corresponding address record 206, which contains the Internet Protocol (IP) address for the service.

Validating Resource Records in a Local Cache

Figure 3:
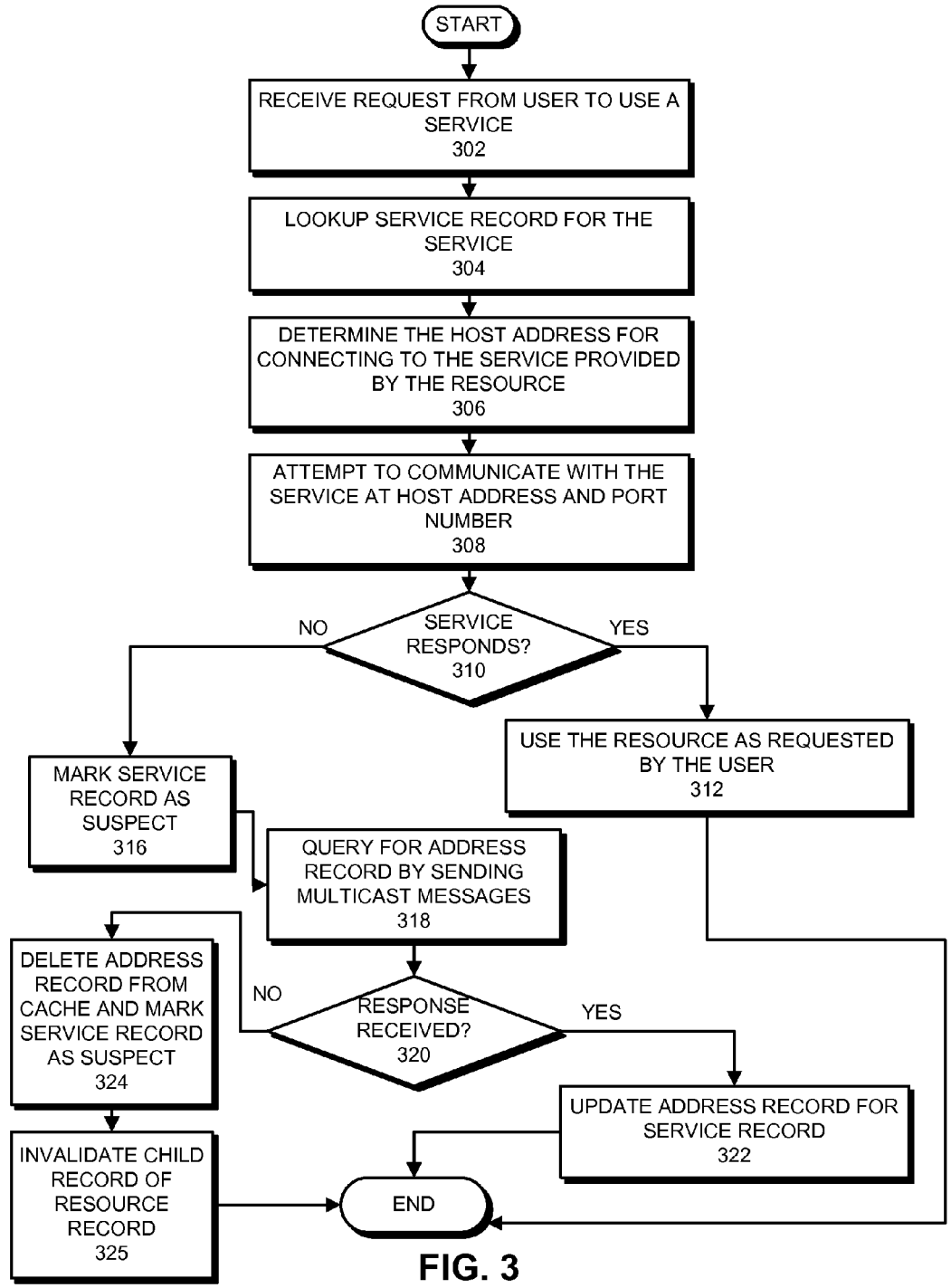
FIG. 3 presents a flowchart illustrating the process of updating a resource record in a cache in accordance with an embodiment of the present invention.

FIG. 3 presents a flowchart illustrating the process of updating or invalidating resource records in a local cache in accordance with an embodiment of the present invention. The system starts when a request is received from a user to use a service on network 100 (step 302). Upon receiving the request, the system looks up the service record 204 for the device (step 304).

Next, the system determines the host address for connecting to the service provided by the resource (step 306). This is accomplished by looking up address record 206 that is referenced by service record 204. Once the host address and port number are known, the system attempts to communicate with the service at the host and port number (step 308). If the communication is successful, i.e., if the service responds (step 310) (which is shown in FIG. 3 as "service responds?"), the system uses the resource as requested by the user (step 312).

If the communication is not successful, i.e., if the service does not respond (step 310), the system marks address record 206 as suspect (step 316). The system then queries for the address record by sending one or more multicast messages to the entire network (step 318), and waiting for a response (step 320). If the service responds, the system updates address record 206 with information included in the response and uses the service as directed by the user (step 322). If no response is received after a specified amount of time and a specified amount of queries, the address record is deleted from the cache and the system marks service record 204 as suspect (step 324). In addition, the system invalidates child records of the resource record (step 325).

At this point, the process repeats and the system sends queries for the service record 204 by sending a multicast message to the entire network, and waiting for a response. If no response is received then service record 204 is deleted from the cache, and the system proceeds to reconfirm service pointer 202 in the same way.

In some embodiments, when a resource record associated with a device is invalidated, the system retrieves a parent record of the resource record at the client (the parent record referring to the resource record). The system then issues a parent-record query for the parent record and waits for a response to the parent-record query from the device. When a response to the parent-record query is not received in a predetermined time, the system invalidates the parent record. In some embodiments, when a given parent record is invalidated, the system recursively repeats, for ancestor records of the parent record, the process of: (1) retrieving an ancestor record, (2) querying for the ancestor record, and, if no response is received, (3) invalidating the ancestor record.

Second-Hand Updating of Resource Records in a Cache

Figure 4:
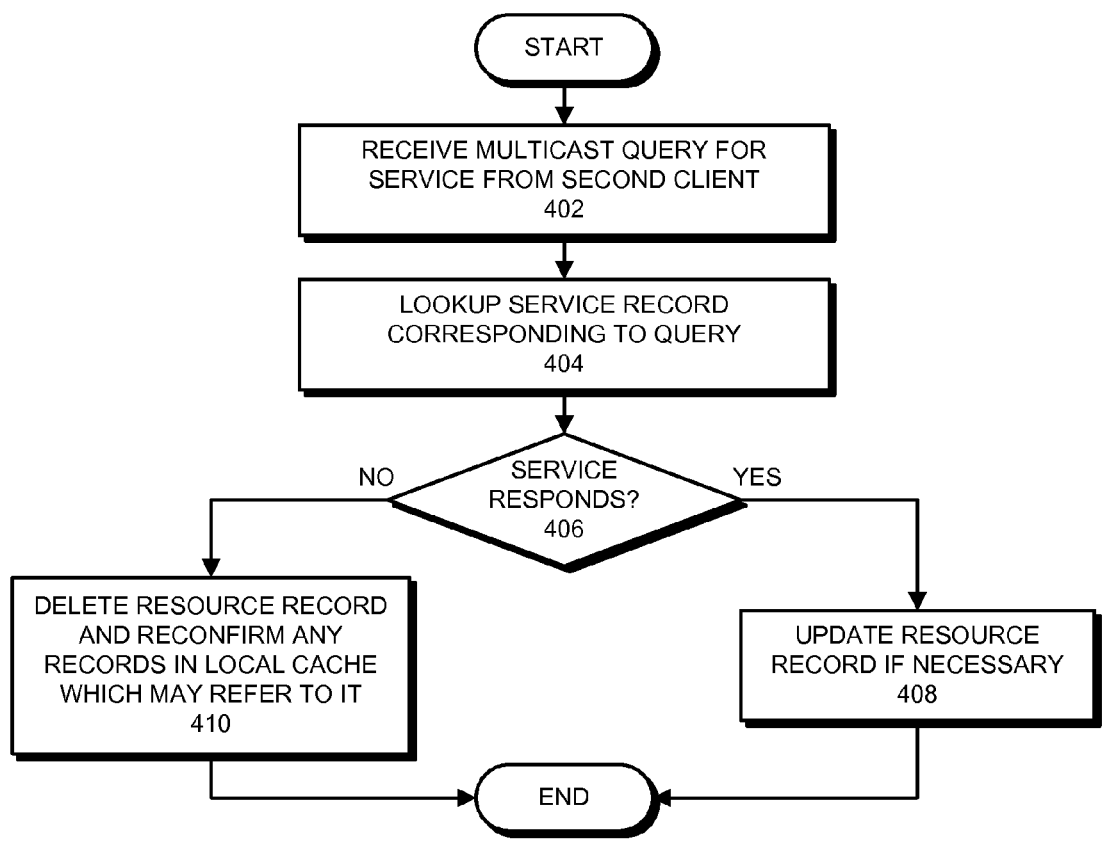
FIG. 4 presents a flowchart illustrating the process of updating a resource record in a cache in response to a query in accordance with an embodiment of the present invention.

FIG. 4 presents a flowchart illustrating the process of updating a resource record 202 in a local cache based on queries performed by other computer systems in accordance with an embodiment of the present invention.

The system starts when computer system 102 receives a multicast message from computer system 104, wherein the multicast message queries a service provided by printer 106 (step 402). Computer system 102 looks in its local cache to locate service record 204 that corresponds to the query from computer system 104 (step 404). Next, computer system 102 waits for a response from the service (step 406). Note that in the present invention, devices and services respond to queries by sending a multicast message to network 100 rather than a unicast message directed only to the system that created the query. By sending a multicast response, this allows other devices on network 100 to update corresponding entries in their local caches without consuming extra bandwidth. If the service responds, computer system 102 updates corresponding resource records, such as address record 206 and service record 204, or creates new versions of address record 206 and service record 204, if necessary (step 408). If there is no response from the service, computer system 102 deletes service record 204 (step 410) as proceeds to reconfirm any records in the local cache which may refer to it.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   receiving at a client, a first multicast message of a query from another client, wherein the query identifies a device;
   locating a resource record associated with the device in a local cache at the client;
   waiting at the client for a multicast message of a response from the device, wherein the response from the device is associated with the query;
   receiving at the client, a predetermined number of multicast messages of the query from the another client without receiving a corresponding multicast message of the response from the device;
   in response to the receiving, invalidating the resource record associated with the device;
   identifying other resource records in the local cache that refer to the invalidated resource record, comprising:
   retrieving a parent record of the invalidated resource record at the client, wherein the parent record refers to the invalidated resource record; and
   issuing a second multicast message of a parent-record query based at least on the parent record.

2. The computer-implemented method of claim 1, further comprising:
   receiving at the client, a multicast message of a response associated with the parent-record query, wherein the response associated with the parent-record query includes information for updating the invalidated resource record; and
   updating the invalidated resource record with the information received in the response associated with the parent-record query.

3. The computer-implemented method of claim 2, further comprising updating the parent record with the information received in the response associated with the parent-record query.

4. The computer-implemented method of claim 1, further comprising:
   first determining that a multicast message of a response associated with the parent: record query is not received;
   in response to the first determining, invalidating the parent record;
   recursively repeating for ancestor records of the parent record:
   retrieving an ancestor record of the ancestor records;
   issuing a third multicast message of an ancestor-record query based at least on the ancestor record;
   second determining that a multicast message of a response to the ancestor record query is not received; and
   in response to the second determining, invalidating the ancestor record.

5. The computer-implemented method of claim 4, wherein the retrieving the ancestor record and the issuing the third multicast message of the ancestor-record query occur at pre-specified time intervals.

6. The computer-implemented method of claim 1, wherein the invalidating the resource record comprises invalidating a child resource record of the resource record.

7. The computer-implemented method of claim 1, further comprising:
   determining that a multicast message of a response associated with the parent-record query is not received in a pre-determined amount of time;
   in response to the determining, marking the parent record as suspect; and
   invalidating the marked parent record.

8. A non-transitory computer-readable medium having instructions stored therein, which when executed by a processor of a client, cause the processor to perform operations, the operations comprising:
   receiving at a client, a first multicast message of a query from another client, wherein the query identifies a device;
   locating a resource record associated with the device in a local cache at the client;
   waiting at the client for a multicast message of a response from the device wherein the response from the device is associated with the query;
   receiving at the client, a predetermined number of multicast messages of the query from the another client without receiving a corresponding multicast message of the response from the device;

in response to the receiving, invalidating the resource record associated with the device; and identifying other resource records in a local cache that refer to the invalidated resource record, comprising:

retrieving a parent record of the invalidated resource record at the client, wherein the parent record refers to the invalidated resource record; and receiving from the another client, a second multicast message of a parent-record query based at least on the parent record.

9. The non-transitory computer-readable medium of claim 8, further comprising:

receiving at the client, a multicast message of a response associated with the parent-record query, wherein the response associated with the parent-record query includes information for updating the invalidated resource record; and updating the invalidated resource record with the information received in the response associated with the parent-record query.

10. The non-transitory computer-readable medium of claim 9, further comprising updating the parent record with the information received in the response associated with the parent-record query.

11. The non-transitory computer-readable medium of claim 7, further comprising:

first determining that a multicast message of a response associated with the parent-record query is not received;

in response to the first determining, invalidating the parent record;

recursively repeating for ancestor records of the parent record:

retrieving an ancestor record of the ancestor records;

issuing a third multicast message of an ancestor-record query based at least on the ancestor record;

second determining that a multicast message of a response to the ancestor-record query is not received; and in response to the second determining, invalidating the ancestor record.

12. The non-transitory computer-readable medium of claim 11, wherein the retrieving the ancestor record and the issuing the third multicast message of the ancestor-record query occur at pre-specified time intervals.

13. The non-transitory computer-readable medium of claim 8, wherein the invalidating the resource record comprises invalidating a child resource record of the resource record.

14. The non-transitory computer-readable medium of claim 8, further comprising:

determining that a multicast message of a response associated with the parent-record query is not received in a pre-determined amount of time; and invalidating the parent record.

15. An apparatus, comprising:

one or more processors; and a memory coupled to the one or more processors;

the one or more processors configured to:

receive at a client, a first multicast message of a query from another client, wherein the query identifies a device;

locate a resource record associated with the device in a local cache at the client;

wait at the client for a multicast message of a response from the device, wherein the response from the device is associated with the query;

determine that a predetermined number of multicast messages of the query from the another client have been received without receiving a corresponding multicast message of the response from the device;

in response to the determine, invalidate the resource record associated with the device;

retrieve a parent record of the invalidated resource record at the client, wherein the parent record refers to the invalidated resource record; and issue a second multicast message of a parent-record query based on at least the parent record; and wait for a pre-determined amount of time for a multicast message of a response associated with the parent-record query.

16. The apparatus of claim 15, wherein the one or more processors are further configured to:

receive at the client, the multicast message of the response associated with the parent-record query, wherein the response associated with the parent-record query includes information for updating the invalidated resource record; and update the invalidated resource record with the information received in the response associated with the parent-record query.

17. The apparatus of claim 16, wherein the one or more processors are further configured to update the parent record with the information received in the response associated with the parent-record query.

18. The apparatus of claim 15, wherein the one or more processors are further configured to:

first determine that the multicast message of the response associated with the parent-record query is not received within the pre-determined amount of time;

in response to the first determine, mark the parent record as suspect;

invalidate the marked parent record;

recursively repeat for ancestor records of the parent record:

retrieve an ancestor record of the ancestor records;

issue a third multicast message of an ancestor-record query based at least on the ancestor record;

second determine that a multicast message of a response to the ancestor-record query is not received; and in response to the second determine, invalidate the ancestor record.

19. The apparatus of claim 18, wherein the retrieve the ancestor record and the issue the third multicast message of the ancestor-record query occur at pre-specified time intervals.

20. The apparatus of claim 15, wherein to invalidate the resource record, the one or more processors are configured to invalidate a child resource record of the resource record.

* * * * *

UNITED STATES PATENT AND TRADEMARK OFFICE
CERTIFICATE OF CORRECTION

PATENT NO. : 9,619,517 B2
APPLICATION NO. : 14/279104
DATED : April 11, 2017
INVENTOR(S) : Cheshire Page 1 of 1

It is certified that error appears in the above-identified patent and that said Letters Patent is hereby corrected as shown below:

In the Claims

Claim 4, Column 6, Line 24, "parent: record query" should read --parent-record query--.

Claim 4, Column 6, Line 33, "ancestor record query" should read --ancestor-record query--.

Claim 11, Column 7, Line 26, "claim 7," should read --claim 8--.

Signed and Sealed this
Tenth Day of July, 2018

Andrei Iancu
*Director of the United States Patent and Trademark Office*